(12) United States Patent
Schnell et al.

(10) Patent No.: US 8,251,191 B2
(45) Date of Patent: Aug. 28, 2012

(54) WET BRAKE COOLING FLUID SYSTEM

(75) Inventors: Ray F. Schnell, Chicago, IL (US); Peter J. Pozivilko, Saint Joseph, MI (US); Brett A. Starr, Michigan City, IN (US)

(73) Assignee: Ausco Products, Inc., Benton Harbor, MI (US)

( * ) Notice: Subject to any disclaimer, the term of this patent is extended or adjusted under 35 U.S.C. 154(b) by 498 days.

(21) Appl. No.: 12/459,482

(22) Filed: Jul. 2, 2009

(65) Prior Publication Data

US 2011/0000750 A1    Jan. 6, 2011

(51) Int. Cl.
*F16D 65/853* (2006.01)

(52) U.S. Cl. ............. 188/264 P; 188/264 R; 188/264 D; 188/264 E

(58) Field of Classification Search ............... 188/71.5, 188/71.6, 264 R, 264 B, 264 D, 264 E, 264 F, 188/264 CC, 264 P; 192/70.12, 113.3, 113.34, 192/113.35, 113.36
See application file for complete search history.

(56) References Cited

U.S. PATENT DOCUMENTS

| | | | | |
|---|---|---|---|---|
| 2,098,490 A | * | 11/1937 | Fitzpatrick et al. | 188/264 D |
| 2,287,130 A | * | 6/1942 | Ramey | 188/264 E |
| 2,750,009 A | * | 6/1956 | Pohl | 188/264 P |
| 2,879,867 A | * | 3/1959 | Rike | 188/264 F |
| 3,101,815 A | * | 8/1963 | Thompson et al. | 188/264 E |
| 3,358,442 A | * | 12/1967 | Cryder | 60/468 |
| 3,882,930 A | * | 5/1975 | Schexnayder | 303/1 |
| 4,315,565 A | * | 2/1982 | Low | 192/113.34 |
| 5,469,943 A | | 11/1995 | Hill et al. | 188/264 F |

OTHER PUBLICATIONS

Drawing No. 90303 (2 sheets) of Ausco Products, Inc., Benton Harbor, Michigan.

* cited by examiner

*Primary Examiner* — Thomas J Williams
(74) *Attorney, Agent, or Firm* — Renner, Kenner, Greive, Bobak, Taylor & Weber

(57) ABSTRACT

A wet brake cooling fluid system includes a cooling fluid supply line that is divided into a plurality of parallel paths. One path is in fluid communication with the motive side of a venturi eductor pump. Another pump is directed into the brake after passing through a fixed orifice that restricts flow. At least on path is in fluid communication with the brake after passing through a valve that is piloted to a brake piston, the valve only opening upon actuation of the brake. A drain hose connects the brake to the suction side of the venturi eductor pump, thereby causing evacuation of the fluid from the brake. Due to the restriction of fluid flowing into the brake by the valve, the brake chamber remains substantially empty during non-braking conditions, and is flooded upon actuation of the brake and opening of the valve.

21 Claims, 4 Drawing Sheets

WET BRAKE COOLING FLUID SYSTEM

TECHNICAL FIELD

This invention relates to a cooling fluid system and network for use with a wet brake. More particularly, this invention relates to such a system wherein a venturi pump is utilized to effect evacuation of the cooling fluid from an inner chamber of the brake, and one or more logic valves are used to control fluid flow into the brake.

BACKGROUND ART

Many forms of industrial equipment and other vehicles use disc braking systems which, during braking, generate a significant amount of heat which needs to be controlled. Further, such systems often require a steady supply of lubrication to ensure efficient operation and long life. One method for dispersing the generated heat and providing lubrication is to supply a flow of cooling and lubricating fluid directly to the brake components within the brake housing. The fluid used in such brakes provides both the cooling and lubricating functions and is often an oil based product. Such brakes are often referred to as "wet" brakes because of the constant supply of fluid to the interior chamber of the brake.

Wet brakes that include a disc assembly that has alternating rotating and stationary discs are referred to as multi-disc brakes. During "roading conditions" the brake pistons are positioned to allow free spinning of the rotating discs and a shaft within a cavity of the brake. A "braking event" occurs when brake pistons or springs of the brake cause the rotating discs to engage the stationary discs, generating friction forces that act to prevent rotation of the shaft. A cooling effect is most needed during the braking event due to the high amount of heat generated by the friction energy between the rotating discs and stationary discs.

While continually providing of fluids to the brake chamber is effective in cooling and lubricating the brake, other problems exist in such a design. Specifically, the inner cavity of the brake is full of fluid during roading conditions as well as during a brake event, when the fluid is most needed for cooling. This causes the rotating discs to experience significant drag as they rotate through the fluid, causing significant oil shear, generating heat, and causing loss of power. Horsepower losses affect the output and drive-train efficiency of the vehicle.

In view of these problems, it is evident that the need exists for a brake which provides sufficient cooling and lubrication during braking conditions but which reduces the drag upon the disc assembly during roading conditions.

DISCLOSURE OF THE INVENTION

It is thus an object of one aspect of the present invention to provide a brake assembly for machinery or the like that includes a cooling fluid system providing lubricating and cooling fluid to the brake.

It is an object of another aspect of the present invention to provide a brake assembly, as above, which provides an increased volume of fluid within the brake upon actuation of the brake.

It is an object of an additional aspect of the present invention to provide a brake assembly, as above, which utilizes a venturi pump method of brake cavity fluid evacuation.

It is an object of a further aspect of the present invention to provide a brake assembly, as above, which utilizes one or more logic valves to signal brake cavity fluid evacuation.

These and other objects of the present invention, as well as the advantages thereof over existing prior art forms, which will become apparent from the description to follow, are accomplished by the improvements hereinafter described and claimed.

In general, a cooling fluid system for use with a wet brake according to the concepts of the present invention includes a cooling fluid inlet line in fluid communication with a cooling fluid reservoir, a cooling fluid outlet line in fluid communication with the inner cavity of the brake, and a venturi eductor pump having a suction side and a motive side. The cooling fluid outlet line is in fluid communication with the suction side of the venturi eductor pump to draw cooling fluid from the brake. The cooling fluid inlet line is split into a plurality of parallel paths including a first path in fluid communication with the motive side of the venturi eductor pump, a second path passing through a valve and into the inner cavity of the brake, and a third path passing through a fixed orifice of a decreased diameter and into the inner cavity of the brake. The valve is closed during non-braking conditions within the brake and is opened during braking conditions within the brake.

In accordance with at least one aspect of the present invention, a brake includes a housing defining an inner cavity, at least one brake piston, and a cooling fluid system. The cooling fluid system acts to restrict flow of cooling fluid into the inner cavity of the brake during non-braking conditions within the brake. The cooling fluid system also acts to flood the inner cavity of the brake with cooling fluid during braking conditions within the brake. The cooling fluid system includes a venturi eductor pump to evacuate cooling fluid from the inner cavity of the brake. The venturi eductor pump includes a motive side and a suction side.

In accordance with at least one aspect of the present invention, a brake includes a housing, an inner cavity defined by the housing, and a cooling fluid system. The cooling fluid system acts to restrict flow of cooling fluid into the inner cavity of the brake during non-braking conditions within the brake. The cooling fluid system also acts to flood the inner cavity of the brake with cooling fluid during braking conditions within the brake. The cooling fluid system includes a venturi eductor pump to evacuate cooling fluid from said inner cavity. The venturi eductor pump has a motive side and a suction side.

A preferred exemplary wet brake cooling fluid system according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A brake assembly made in accordance with the present invention is indicated generally by the numeral 10. Brake assembly 10 includes at least one brake 12 and a fluid system 14. Brake 12 may be any wet brake known to those skilled in the art, such as, for example, a multi-disc wet brake as will be discussed in greater detail below. Fluid system 14 provides pressurized hydraulic fluid to one or more brake pistons via fluid supply lines that are in communication with actuation mechanisms, and also provides cooling oil to cool and lubricate the brake components.

Figure 1:
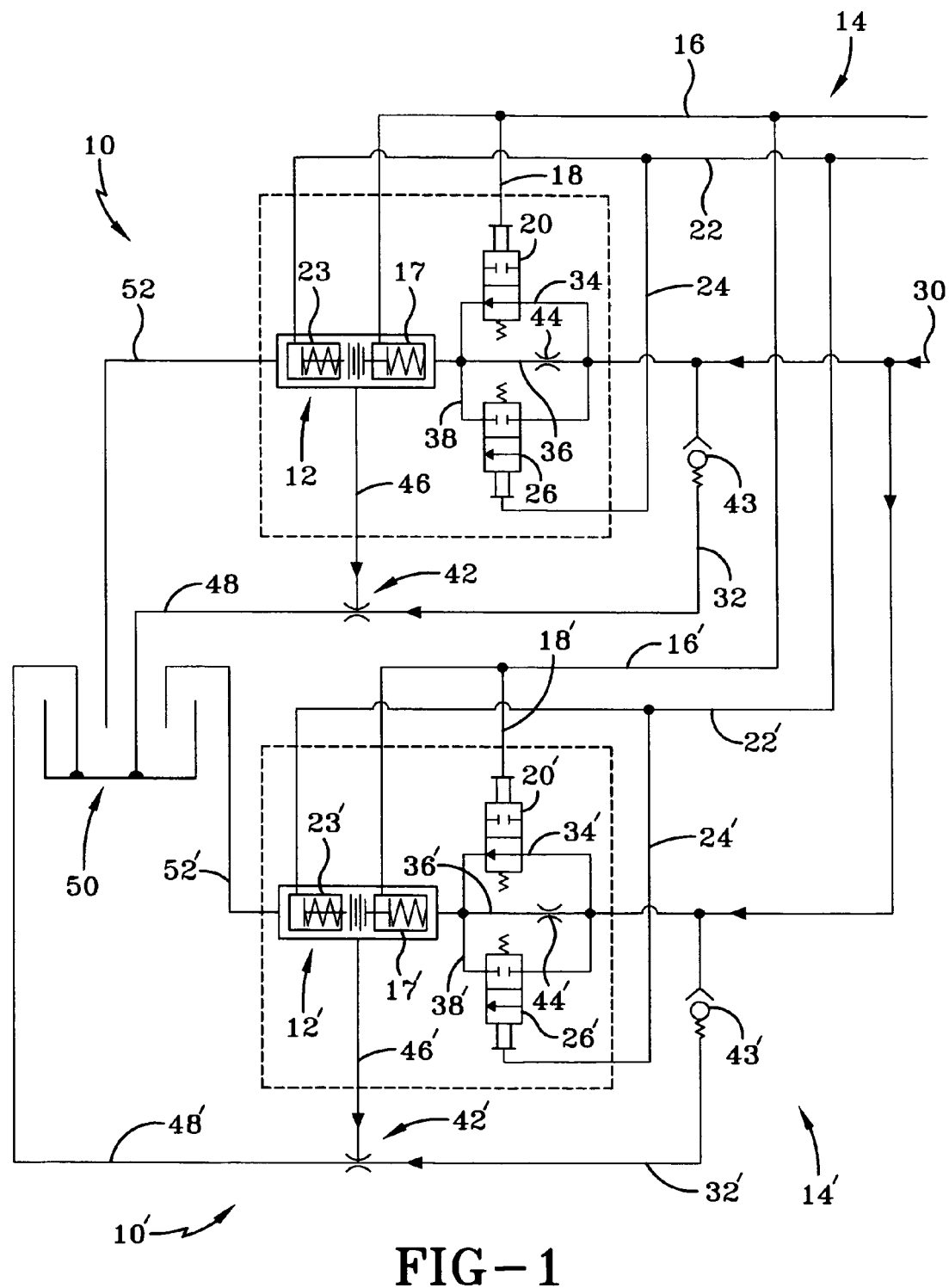
FIG. 1 is a schematic circuit diagram depicting a fluid flow system according to the concepts of the invention.

FIG. 1 depicts a brake assembly 10 including a left brake 12' and a right brake 12' configured in parallel relationship within fluid system 14. Left brake assembly 10 and right brake assembly 10' are substantially identical, and therefore only left brake assembly 10 will be discussed in detail herein. It should be appreciated, however, that right brake assembly 10' includes identical components, which are numbered with like numerals accordingly. It will be appreciated by those skilled in the art that the combined fluid system depicted schematically in FIG. 1 can easily be adapted to include more or less brakes.

Fluid system 14 of brake assembly 10 includes a failsafe piston fluid supply line 16 in fluid communication with a failsafe piston 17 in brake 12. Failsafe piston 17 is a spring applied, hydraulically released piston as is well known in the art. Thus, failsafe piston is actuated and creates a braking force due to a spring biasing mechanism, unless a high pressure hydraulic fluid forces the piston to compress the springs. Failsafe piston supply line 16 is in communication with a hydraulic circuit of the vehicle on which brake assembly 10 is installed so that, when the vehicle is running, pressure within the hydraulic circuit causes automatic release of the failsafe piston 17. Conversely, when the vehicle is turned off and the pressure within the vehicles hydraulic circuit is removed, failsafe piston 17 is actuated. A failsafe valve pilot line 18 branches off from failsafe piston supply line 16 and is in fluid communication with a failsafe valve 20. Failsafe valve 20 is a spring biased open, pilot to close cartridge valve. Thus, the valve is biased in an open position and is caused to close when pressure is applied through the failsafe valve pilot line 18. As a result, failsafe valve 20 remains closed during operation of the vehicle because the vehicle's hydraulic circuit provides a pressure within failsafe valve pilot line 18, and is opened when the vehicle is turned off and the pilot pressure is removed, thereby causing a braking force to be applied.

Fluid system 14 also includes a service piston fluid supply line 22 that is in fluid communication with a service piston 23 within brake 12. Service piston 23 is a hydraulic applied, spring release piston, as is known to those skilled in the art. Thus, service piston 23 is actuated upon the introduction of a high pressure hydraulic fluid, thereby creating a braking force. When the pressurized hydraulic fluid is removed, a spring release mechanism returns service piston 23 to an unactuated position. Service piston fluid supply line 22 is in fluid communication with a brake actuating mechanism, such as a brake pedal, that provides an increase in pressure therein when actuated. This increase in pressure causes actuation of service piston 23, which thereby provides a braking force within brake 12. A service valve pilot line 24 branches off from service piston fluid supply line 22 and is in fluid communication with a service valve 26. Service valve 26 is a spring biased closed, pilot to open cartridge valve, meaning that the valve is typically in a closed position and opens only when pressurized fluid is provided within service valve pilot line 24. Thus, when brake 12 is actuated and the pressure is increased within service piston fluid supply line 22, the pressure is also increased in service valve pilot line 24 causing service valve 26 to be opened.

Fluid system 14 includes a cooling fluid supply line 30, which carries a cooling and lubricating fluid. The cooling and lubricating fluid may be any suitable fluid known to those skilled in the art such as, for example, a petroleum based fluid. Cooling fluid supply line 30 is split into four parallel paths before entering brake 12: A first cooling fluid supply path 32, a second cooling fluid supply path 34, a third cooling fluid supply path 36, and a fourth cooling fluid supply path 38. First cooling fluid supply path 32 is connected to the motive side of a venturi eductor pump 42, and includes a one way flow check valve 43 therein to prevent reverse flow in the opposite direction. Second cooling fluid supply path 34 passes through failsafe valve 20 and is in fluid communication with brake 12. Third cooling fluid supply path 36 passes through a fixed orifice 44, which has a reduced diameter and restricts flow therethrough, and then into brake 12. Fourth cooling fluid supply path 38 passes through service valve 26 and is in fluid communication with brake 12.

A drain line 46 exits brake 12 and is connected to the suction side of venturi eductor pump 42. As will be appreciated by those skilled in the art, the fluid flow entering the motive side of venturi eductor pump 42 creates a suction force at the suction side of the pump. The cooling fluid is thereby evacuated from brake 12 through drain line 46 and through a discharge line 48 extending from a discharge side of the venturi pump, along with cooling fluid within first cooling fluid supply path 32, to a cooling fluid reservoir 50. In addition, an overflow vent line 52 is in fluid communication with brake 12 and cooling fluid reservoir 50 so as to prevent overfilling of brake 12 during braking conditions.

During operation of the vehicle under non-braking conditions, failsafe valve 20 is in a closed position due to the pressure within failsafe valve pilot line 18. As used herein, the term "non-braking conditions" shall refer to operation of the vehicle where no braking force is applied by the brakes. Thus, no cooling fluid is allowed to flow through second cooling fluid supply path 34 into brake 12. Service valve 26 is also closed during non-braking conditions as a result of lack of pressure within service valve pilot line 24. Thus, no cooling fluid is allowed to flow through fourth cooling fluid supply path 38 and into brake 12. Therefore, during non-braking conditions within brake 12, cooling fluid is allowed to flow into brake 12 only through third cooling fluid supply path 36. The amount of cooling fluid passing through third cooling fluid supply path 36 is relatively small due to fixed orifice 44 which restricts flow.

Fixed orifice 44 may be adjusted in size so as to provide a desired flow of cooling fluid to brake 12 during non-braking conditions, which ideally is only enough fluid to lubricate the brake components. The cooling fluid flowing through first cooling fluid supply path 32 into venturi eductor pump 42 creates suction through drain line 46, thereby ensuring that cooling fluid is consistently drawn from brake 12. During non-braking conditions, this suction causes cooling fluid to be evacuated from brake 12 faster than the rate at which the cooling fluid enters through fixed orifice 44.

When the vehicle is turned off and pressure is removed from failsafe valve pilot line 18, failsafe valve 20 is opened. Opening of failsafe valve 20 causes cooling fluid to flood brake 12. The flow of cooling fluid into brake 12 is increased significantly when failsafe valve 20 is opened as a result of the relatively large flow-path therethrough, as compared to fixed orifice 44. For example, fixed orifice 44 may have an opening with a diameter of approximately one millimeter, whereas failsafe valve 20 may have an opening with a diameter of approximately 10 millimeters. Thus, as a result of the opening of failsafe valve 20 when the vehicle is turned off, brake 12 is caused to flood and be filled with the cooling and lubricating fluid.

Similarly, when brake 12 is actuated, service valve 26 is caused to open by the increase in pressure within service valve pilot line 24. Opening of service valve 26 causes brake 12 to flood with cooling and lubricating fluid, thereby cooling the brake components during braking. As discussed above, the opening of service valve 26 is significantly larger than the opening of fixed orifice 44, thereby allowing a significant increase in fluid flow into brake 12 when service valve 26 is open. When pressure is removed from service valve pilot line 24 and braking forces are released, service valve 26 again closes and cooling fluid flow into brake 12 is again restricted to third cooling fluid supply path 36 and fixed orifice 44. The suction created by venturi eductor pump 42 causes the cooling fluid to be quickly evacuated from brake 12 when non-braking conditions return, thereby significantly reducing drag on rotating brake components.

Overflow vent line 52 is positioned within cooling fluid reservoir 50 so that the cooling fluid is discharged from the overflow vent line and into the reservoir above the fluid sump level. Thus, the end of overflow vent line 52 within in cooling fluid reservoir 50 is not submerged in cooling fluid during non-braking conditions. This positioning of overflow vent line 52 allows venturi eductor pump 42 to draw air through brake 12 during non-braking conditions. Otherwise, as a result of the flow of fluid out through drain line 46 being greater than the flow in through third cooling supply path 36 and fixed orifice 44 during non-braking conditions, a vacuum would be created within brake 12.

Figure 2:
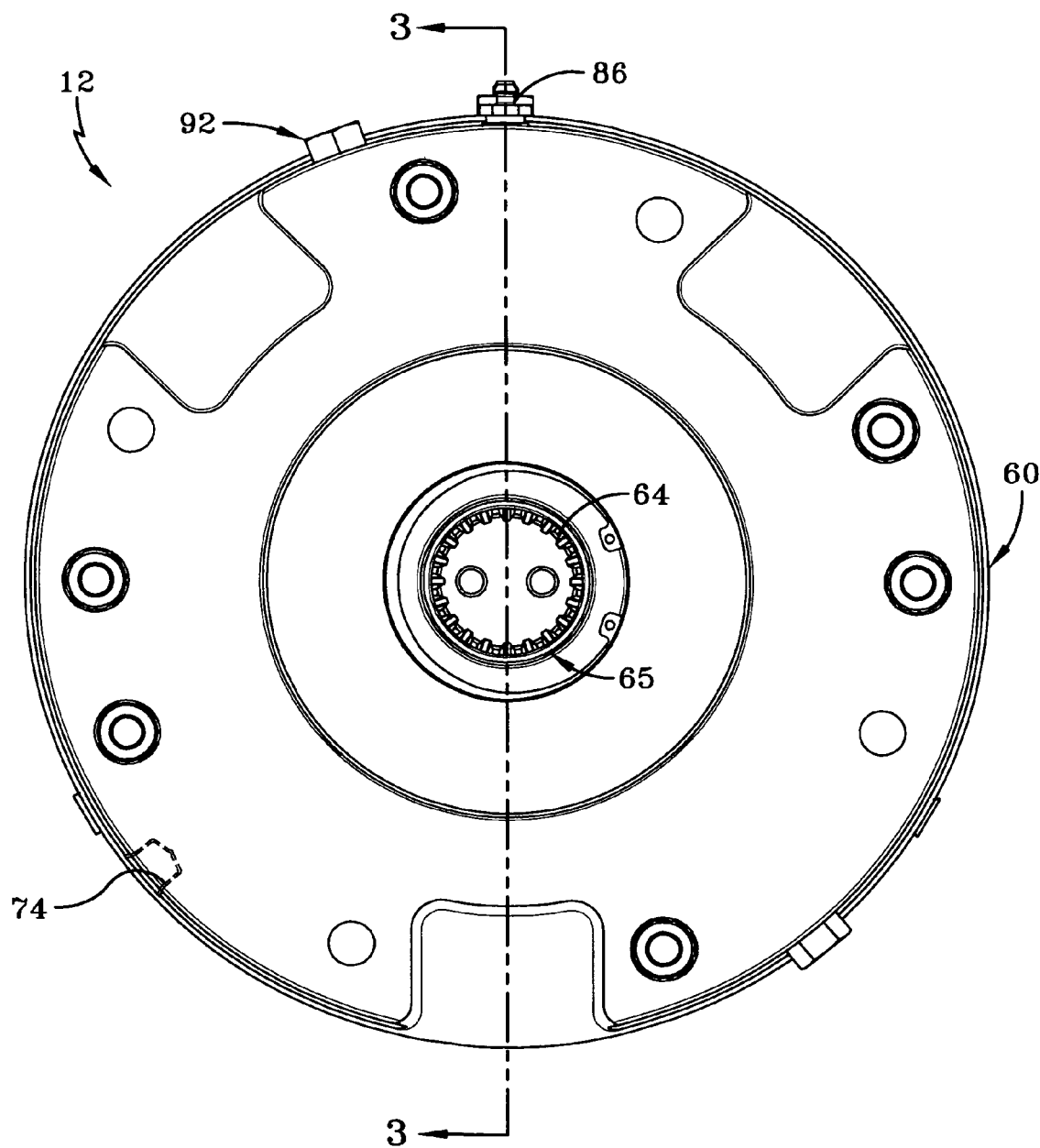
FIG. 2 is an elevational view of a brake according to the concepts of at least one aspect of the invention.
Figure 3:
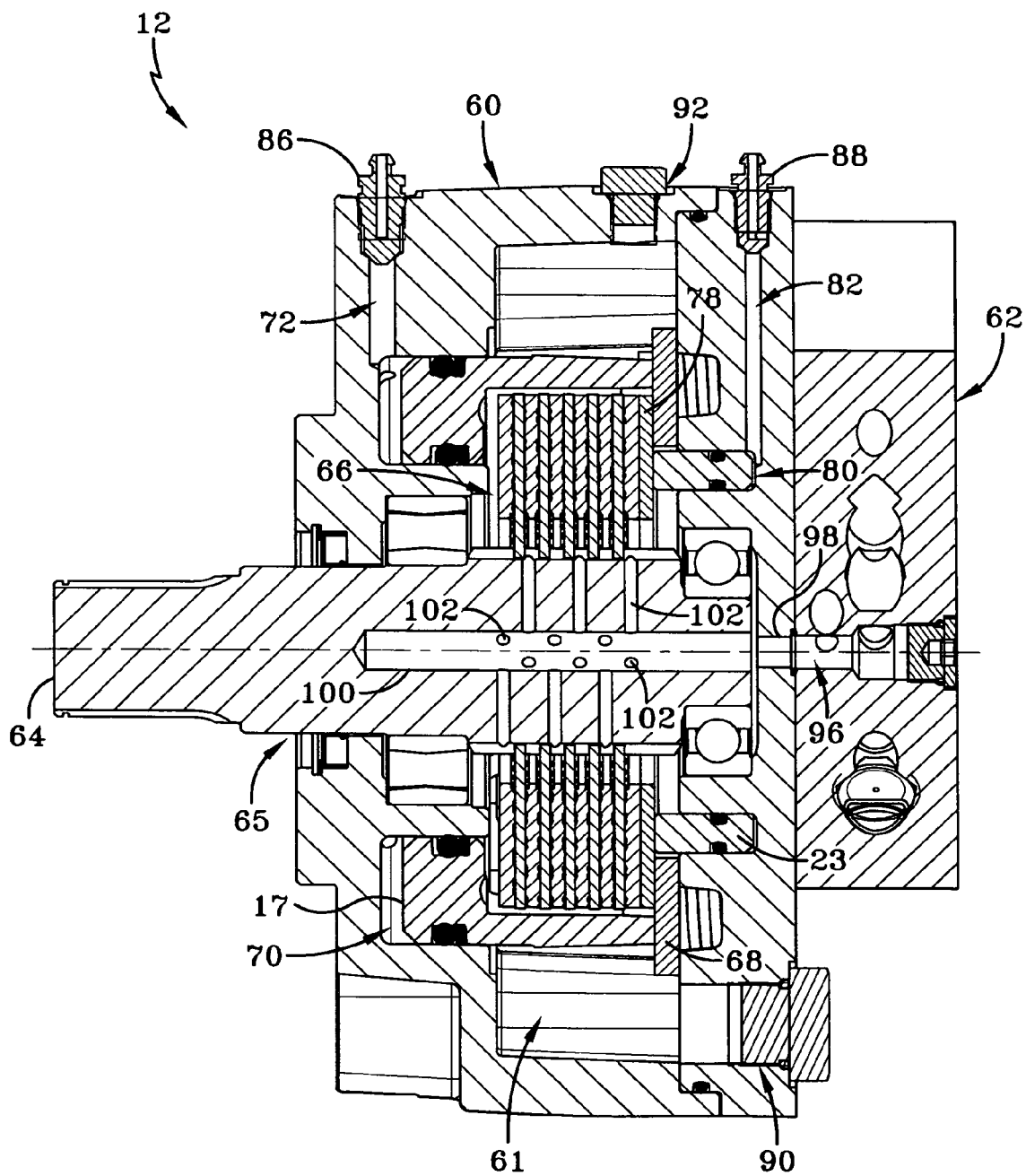
FIG. 3 is a sectional view taken across line 3-3 of FIG. 2 showing the internal components of the brake.
Figure 4:
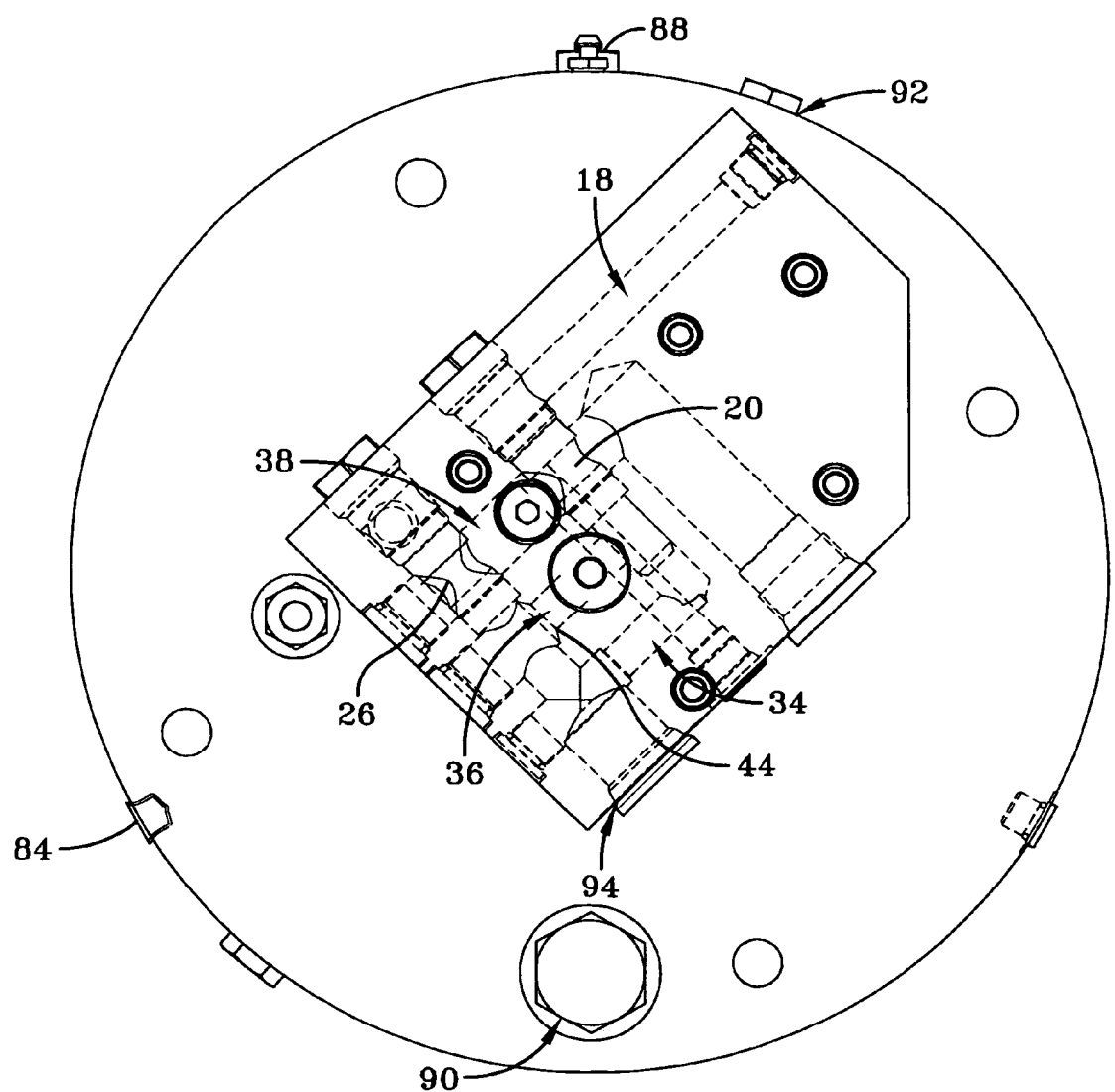
FIG. 4 is a side elevational view of the brake of FIG. 2 showing the brake manifold.

Referring now to FIGS. 2-4, an exemplary brake 12 which may be used in conjunction with the fluid system 14 depicted in FIG. 1 is shown. It is contemplated, however, that any wet brake known to those skilled in the art may be adapted to be used with the fluid system as discussed above. Brake 12 includes a housing 60 defining an inner cavity 61 (FIG. 3). A manifold 62 is provided on one side of housing 60 and includes a number of ports and fluid passageways as will be discussed hereinafter in greater detail (FIG. 4), and as described with reference to the fluid flow network depicted in FIG. 1. A rotating shaft 64 from the vehicle extends through an opening 65 in housing 60 opposite manifold 62 and is positioned within inner cavity 61. A disc assembly 66 is positioned concentrically around rotating shaft 64 and includes a plurality of stationary discs and a plurality of rotating discs as is well known in the art.

One end of the failsafe piston 17 engages a primary disc 68 that is spring biased to compress disc assembly 66. A failsafe piston fluid chamber 70 is provided opposite primary disc 68 and is in fluid communication with a failsafe fluid channel 72 through housing 60. Failsafe fluid channel 72 exits housing 60 at a failsafe fluid port 74 (FIG. 2), which is connected to and in fluid communication with failsafe piston fluid supply line 16 (FIG. 1).

Service piston 23 is in contact with a secondary disc 78 that is adapted to engage and compress disc assembly 66. A service piston fluid chamber 80 is provided adjacent service piston 23 opposite disc assembly 66 and is in fluid communication with a service fluid channel 82 through housing 60. Service fluid channel 82 exits housing 60 at a service fluid port 84 (FIG. 4), which is connected to and in fluid communication with service piston fluid supply line 22 (FIG. 1). A failsafe fluid bleeder port 86 (FIG. 3) is provided in housing 60 and is in fluid communication with failsafe piston fluid chamber 70 so as to allow for bleeding of hydraulic fluid therefrom. Similarly, a service fluid bleeder port 88 (FIG. 3) is provided in housing 60 and is in fluid communication with service piston fluid chamber 80 so as to allow for bleeding of hydraulic fluid therefrom. A drain port 90 is provided in housing 60 and opens into inner cavity 61. Drain port 90 is connected to and in fluid communication with drain line 46 (FIG. 1), which is connected to venturi eductor pump 42 so as to facilitate evacuation of the cooling fluid from brake 12. As shown in FIG. 4, a vent port 92 is provided in housing 60 opposite drain port 90 and opens into inner cavity 61. Vent port 92 is connected to and in fluid communication with overflow vent line 52 (FIG. 1). By positioning drain port 90 and vent port 92 opposite each other, brake 12 can be mounted on the vehicle so that drain port 90 is on a bottom end of brake 12 and vent port 92 is at a top end. It will be appreciated by those skilled in the art that positioning drain port 90 at a bottom end of brake 12 facilitates the draining function thereof, and that positioning vent port 92 at a top end of brake 12 facilitates the overflow venting, as intended.

Manifold 62 includes a cooling fluid inlet port 94 that is connected to and in fluid communication with cooling fluid supply line 30 (FIG. 1). Cooling fluid inlet port 94 opens into a plurality of passageways within manifold 62 corresponding to second cooling fluid supply path 34, third cooling fluid supply path 36, and fourth cooling fluid supply path 38 as previously described and shown in the schematic of FIG. 1. Thus, second cooling fluid supply path 34 is typically blocked by failsafe valve 20 in a closed position. Third cooling fluid supply path 36 passes through fixed orifice 44 within manifold 62. Fourth cooling fluid supply path 38 is blocked by service valve 26 during non-braking conditions. Each of the three cooling fluid supply paths within manifold 62 re-converge at a cooling fluid inlet channel 96 that is aligned with and in fluid communication with an aperture 98 through housing 60 (FIG. 3). Both cooling fluid inlet channel 96 and aperture 98 are aligned with and in fluid communication with a bore 100 within rotating shaft 64. A plurality of radial holes 102 extend outwardly from bore 100 through shaft 64 to allow cooling fluid to enter inner cavity 61 of housing 60. Failsafe valve pilot line 18 extends through manifold 62 and is in fluid communication with failsafe valve 20 therein.

It is thus evident that a wet brake cooling fluid system constructed as described herein accomplishes the objects of the present invention and otherwise substantially improves the art.

What is claimed is:

1. A cooling fluid system for use with a wet brake having an inner cavity defined by a housing, the cooling fluid system comprising a cooling fluid inlet line in fluid communication with a cooling fluid reservoir, a cooling fluid outlet line in fluid communication with the inner cavity of the brake, and a venturi eductor pump having a suction side and a motive side, said cooling fluid outlet line being in fluid communication with said suction side of said venturi eductor pump to draw cooling fluid from the brake, said cooling fluid inlet line being split into a plurality of parallel paths including a first path in fluid communication with said motive side of said venturi eductor pump, a second path passing through a valve and into the inner cavity of the brake, and a third path passing through a fixed orifice of a decreased diameter and into the inner cavity of the brake, wherein said valve is closed during non-braking conditions within the brake and is opened during braking conditions within the brake.

2. The cooling fluid system of claim 1, wherein said valve is a spring biased closed, pilot to open cartridge valve.

3. The cooling fluid system of claim 2, further comprising a service piston fluid supply line providing a service piston within the brake with hydraulic fluid, wherein said valve is piloted to the pressure within said service piston fluid supply line.

4. The cooling fluid system of claim 1, further comprising a discharge line connecting and in fluid communication with said venturi eductor pump and said cooling fluid reservoir, said discharge line carrying cooling fluid from said first path of said cooling fluid inlet line and said cooling fluid outlet line to said cooling fluid reservoir after it passes through said venturi eductor pump.

5. The cooling fluid system of claim 1, further comprising an overflow vent line connecting and in fluid communication with the inner cavity of the brake and said cooling fluid reservoir, said overflow vent line having an outlet end positioned in said cooling fluid reservoir above the sump level.

6. The cooling fluid system of claim 1, further comprising a second valve, wherein said cooling fluid inlet line includes a fourth path passing through said second valve and into the inner cavity of the brake, said second valve being closed during non-braking conditions within the brake.

7. The cooling fluid system of claim 6, wherein said valve is a spring biased open, pilot to close cartridge valve.

8. The cooling fluid system of claim 7, further comprising a failsafe piston fluid supply line providing a failsafe piston within the brake with hydraulic fluid, wherein said second valve is piloted to the pressure within said failsafe piston fluid supply line.

9. The cooling fluid system of claim 1, further comprising a one-way check valve in said first path of said cooling fluid inlet line.

10. A brake comprising a housing defining an inner cavity, at least one brake piston, and a cooling fluid system, said cooling fluid system acting to restrict flow of cooling fluid into said inner cavity during non-braking conditions, and to flood said inner cavity with cooling fluid during braking conditions, said cooling fluid system including a venturi eductor pump to evacuate cooling fluid from said inner cavity, the venturi eductor pump having a motive side and a suction side, said suction side of said venturi eductor pump being in fluid communication with said inner cavity of said brake, said brake piston being supplied with hydraulic fluid by a brake piston fluid supply line, wherein the cooling fluid flow into said inner cavity is controlled by a valve piloted to the pressure within the brake piston fluid supply line.

11. A brake comprising a housing defining an inner cavity, at least one brake piston, and a cooling fluid system, said cooling fluid system acting to restrict flow of cooling fluid into said inner cavity during non-braking conditions, and to flood said inner cavity with cooling fluid during braking conditions, said cooling fluid system including a venturi eductor pump to evacuate cooling fluid from said inner cavity, the venturi eductor pump having a motive side and a suction side, said suction side of said venturi eductor pump being in fluid communication with said inner cavity of said brake, a service piston and a failsafe piston, said cooling fluid system including a cooling fluid inlet line in fluid communication with a cooling fluid reservoir, a cooling fluid outlet line in fluid communication with said inner cavity of the brake, said cooling fluid outlet line being in fluid communication with said suction side of said venturi eductor pump to draw cooling fluid from said inner cavity, said cooling fluid inlet line being split into a plurality of parallel paths including a first path in fluid communication with said motive side of the venturi eductor pump, a second path passing through a service valve and into said inner cavity of said brake, a third path passing through a fixed orifice and into said inner cavity of said brake, and a fourth path passing through a failsafe valve and into said inner cavity of said brake, wherein said service valve and said failsafe valve are closed during non-braking conditions within the brake.

12. The brake of claim 11, wherein said service piston is a hydraulic applied, spring release piston, and said service valve is a spring biased closed, pilot to open cartridge valve.

13. The brake of claim 12, further comprising a service piston fluid supply line providing said service piston with hydraulic fluid, wherein said service valve is piloted to the pressure within said service piston fluid supply line.

14. The brake of claim 11, further comprising a discharge line connecting and in fluid communication with said venturi eductor pump and said cooling fluid reservoir, said discharge line carrying cooling fluid from said first path of said cooling fluid inlet line and said cooling fluid outlet line to said cooling fluid reservoir after it passes through said venturi eductor pump.

15. The brake of claim 11, further comprising an overflow vent line connecting and in fluid communication with said inner cavity of said brake and said cooling fluid reservoir, said overflow vent line having an outlet end positioned in said cooling fluid reservoir above the sump level.

16. The brake of claim 11, wherein said failsafe piston is a spring applied, hydraulic release piston, and said failsafe valve is a spring biased open, pilot to close cartridge valve.

17. The brake of claim 16, further comprising a failsafe piston fluid supply line provides said failsafe piston with hydraulic fluid, wherein said failsafe valve is piloted to the pressure within said failsafe piston fluid supply line.

18. A brake comprising a housing, an inner cavity defined by said housing, and a cooling fluid system, said cooling fluid system acting to restrict flow of cooling fluid into said inner cavity during non-braking conditions, and to flood said inner cavity with cooling fluid during braking conditions, said cooling fluid system including a venturi eductor pump to evacuate cooling fluid from said inner cavity, said venturi eductor pump having a motive side and a suction side, said suction side of said venturi eductor pump being in fluid communication with said inner cavity of said brake, said cooling fluid system further including a cooling fluid inlet line and a cooling fluid outlet line, said cooling fluid inlet line having a plurality of parallel paths including a first path directed to said motive side of said venturi eductor pump, a second path passing through a valve and into said inner cavity in said housing, and a third path passing through a fixed orifice and into said inner cavity in said housing, said valve being closed during non-braking conditions within the brake, and open during braking conditions, said cooling fluid outlet line being connected to said suction side of said venturi eductor pump.

19. The brake of claim 18, wherein said valve is a spring biased closed, pilot to open cartridge valve, and wherein said valve is piloted to the pressure within a hydraulic brake actuating mechanism used to actuate the brake.

20. The brake of claim 18, further comprising a cooling fluid reservoir and an overflow vent line connecting and in fluid communication with said cooling fluid reservoir and said inner cavity of the brake.

21. The brake of claim 20, wherein an end of said overflow vent line is positioned within said cooling fluid reservoir above the sump level.

* * * * *